(12) United States Patent  
Koseki

(10) Patent No.: US 7,230,887 B2  
(45) Date of Patent: Jun. 12, 2007

(54) MULTIPLE DISC PLAYER HAVING DISC GUIDES FOR RELOCATING DISLOCATED DISCS

(75) Inventor: Tomohisa Koseki, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 437 days.

(21) Appl. No.: 10/455,627

(22) Filed: Jun. 6, 2003

(65) Prior Publication Data

US 2003/0227837 A1   Dec. 11, 2003

(30) Foreign Application Priority Data

Jun. 10, 2002   (JP) .............................. 2002-168160

(51) Int. Cl.  
*G11B 17/22* (2006.01)

(52) U.S. Cl. .................................. 369/30.78

(58) Field of Classification Search ............. 369/30.87, 369/30.78, 30.77, 30.76, 30.64, 30.03, 30.85, 369/30.9  
See application file for complete search history.

(56) References Cited

U.S. PATENT DOCUMENTS 5,831,948 A * 11/1998 Suzuki .................... 369/30.85  
6,337,842 B1 * 1/2002 Wolfer et al. ............ 369/30.57  
6,359,853 B1 * 3/2002 Nakamichi ............. 369/178.01  
6,400,659 B1 * 6/2002 Kitaoka .................. 369/34.01  
6,674,711 B1 * 1/2004 Shiba ..................... 369/178.01  
6,760,052 B2 * 7/2004 Cummins et al. ........... 347/171  
6,922,842 B2 * 7/2005 Takahashi et al. .......... 720/684  
6,990,675 B2 * 1/2006 Suzuki et al. ............... 720/672

* cited by examiner

*Primary Examiner*—Angel Castro  
(74) *Attorney, Agent, or Firm*—Wenderoth, Lind & Ponack, L.L.P.

(57) ABSTRACT

The present invention was developed in order to provide a disc player, whereby even when an inserted disc is not normally set on a stocker, or a normally set disc is dislocated from a stocker, the disc can be reset in the normal position on the stocker during a stocker lifting/division operation, so that the normal operating condition can be quickly recovered without troublesome removing activities, comprising multiple stockers for stocking discs and a lifting division device to conduct the lifting/division of these stockers, wherein disc guides for controlling the movement of a disc unexpectedly dislocated from a stocker are mounted.

20 Claims, 19 Drawing Sheets

MULTIPLE DISC PLAYER HAVING DISC GUIDES FOR RELOCATING DISLOCATED DISCS

BACKGROUND OF THE INVENTION

1. Field of the Invention

The present invention relates to a disc player and, more particularly, to a disc player which can reproduce information recorded in discs such as compact discs (CDs) and DVDs (Digital Versatile Discs).

2. Description of the Relevant Art

FIG. 26 is a sectional side view schematically showing the construction of a mobile disc player having an autochanger function disclosed in Japanese Kokai No. 2000-48462. A housing 51 constituting a disc player 50 comprises a main chassis 52. At the front of the disc player 50, a front panel 54 with a disc insert/eject slot 54a for insertion and ejection of a disc 53 formed thereon is mounted.

Above the forward portion of the main chassis 52, a mount chassis 60, which can be displaced up and down by engagement thereof with turntable lifting slide plates (not shown) slidably mounted on the sidewalls of the main chassis 52, is arranged.

On the mount chassis 60, a floating chassis 62 is arranged through a floating mechanism 61 comprising a locking member 61a, a locking shaft 61b and spring parts 61c. With the floating mechanism 61, the influence of vibration or shock applied from the outside during reproduction can be reduced.

On the floating chassis 62, a slide chassis 63 is mounted in such a manner as to be slidable in a back-and-forth direction relative to the floating chassis 62. On the slide chassis 63, a swing board 66 swingable in an arc, on which a turntable unit 64 having a turntable 64a, and a pickup unit (hereinafter, referred to as a PU unit) 65 are mounted, is placed.

Above the swing board 66, an insert/eject mechanism 73 comprising a disc supporting plate 70 for supporting the disc 53, an insert/eject roller 71 for moving the disc 53 supported by the disc supporting plate 70 backward and forward, and a shutter section 72 whereby the disc insert/eject slot 54a is opened or closed, are arranged. With the insert/eject mechanism 73, the insertion/ejection operation of the disc 53 can be conducted.

At prescribed places in the rearward portion of the main chassis 52, a couple of lifting guides 55 are vertically mounted. On the main chassis 52, a stocker bottom board 80, six stockers 81 for setting discs 53 thereon, and a stocker top board 82 for retaining the surface of a disc 53 set on the uppermost stocker 81 in ascending order, are laminated with the lifting guides 55 inserted through insertion holes (not shown) arranged in each of them.

The stocker bottom board 80 is in engagement with lifting slide plates 56 slidably mounted on the sidewalls of the main chassis 52 in a manner whereby it moves up and down with the movement of the lifting slide plates 56.

The stockers 81 are in engagement with division slide plates 57 slidably mounted on the sidewalls of the main chassis 52 in a manner whereby they are divided into the upper and lower parts with the movement of the division slide plates 57. In insertion, ejection, reproduction or the like of a disc 53, a prescribed space is formed by the division so that the PU unit 65 can approach the disc 53. Drive motors (not shown) as driving forces for slidably driving these turntable lifting slide plates, lifting slide plates 56 and division slide plates 57 are arranged in two corners of the rear of the main chassis 52.

On both side portions of the stocker top board 82, hooks (not shown) for hooking coil springs (not shown) are formed. One end of a slender coil spring is caught with the hook, while the other end thereof is caught with a hook (not shown) arranged near the center of the stocker bottom board 80. With these coil springs, the overall stockers 81 are energized for being closer, even if the stockers 81 are under divided conditions or all of them are set close.

A control circuit 90, conducting driving control of each section, which is mounted on a substrate, is arranged on the outside wall of the main chassis 52.

FIG. 27 comprises diagrams schematically showing the construction of the stocker 81, wherein FIG. 27(a) is a perspective view, while FIG. 27(b) is an enlarged fragmentary view showing an antifloating claw.

The stocker 81 comprises a periphery 81a formed in the shape of an almost semicircular arc so as to surround the outer regions of a disc 53, and a narrow disc receiver 81b for supporting the outer regions of the disc 53. In the rear portion of the periphery 81a, antifloating claws 81c for preventing the disc 53 set on the disc receiver 81b from floating upward are formed. The antifloating claw 81c is formed so as to be inwardly convex from the inner wall surface of the periphery 81a with a claw portion 81e having a slightly tapered plane 81d formed thereon.

In both side portions of the periphery 81a, division projections 81f for lifting/division by engagement with the division slide plates 57, and a couple of insertion holes 81g for inserting the lifting guides 55 therethrough are formed. In both end portions of the periphery 81a, dislocation preventive projections 81h for preventing the dislocation of the stockers 81 when they are put in piles are formed.

The main operation of the conventional disc player 50 is described below.

FIG. 28 comprises simplified side views showing the operation of the conventional disc player 50, which illustrate the insertion operation of a disc 53.

FIG. 28(a) shows an insertion standby state where the disc 53 can be inserted. With the insert/eject roller 71 being lowered, the insert/eject mechanism 73 is in a state of being capable of pulling in the disc 53 to be inserted.

When the fifth stocker 81 from the bottom (hereinafter, referred to as the fifth stocker) is selected as a stocker on which the disc 53 is set, the first to fourth stockers 81 are kept close, while the fifth stocker is caused to ascend so that the turntable unit 64 can enter between the fourth and fifth stockers.

The upper stocker thereabove (the sixth stocker in this case) is caused to move further upward so that the disc 53 can be carried into the space between the selected fifth stocker and the sixth stocker. The turntable unit 64 is on standby at a prescribed standby position in order to hold the inserted disc 53 on the turntable 64a and carry it to the stocker 81 side.

FIG. 28(b) shows a state where one disc 53 is inserted in the disc insert/eject slot 54a. The insert/eject roller 71 of the insert/eject mechanism 73 is driven to once pull the inserted disc 53 into the interior of the system, and then the shutter section 72 is closed (FIG. 28(c)).

Then, the disc 53 is conveyed in the reverse direction and the positioning thereof is conducted at a place where it is brought into engagement with the shutter section 72 (FIG. 28(d)). To the disc 53 located in FIG. 28(d), the turntable unit 64 is caused to ascend, and the disc 53 is placed on the turntable 64*a*. By operating a catching mechanism (not shown) of the turntable unit 64, the disc 53 is clamped to the turntable 64*a* (FIG. 28(*e*)).

By sliding the slide chassis 63 to the stocker 81 side, the turntable unit 64 is horizontally moved so as to pull the disc 53 out of the insert/eject mechanism 73 and move it between the fifth and sixth stockers 81 (FIG. 28(*f*)). After moving the disc 53 to the reproduction position, the locking shaft 61*b* fixed with the locking member 61*a* is released, so that the turntable unit 64 is made in a state of mechanically floating with the floating mechanism 61. The turntable 64*a* is rotatably driven so as to reproduce the disc 53 (FIG. 28(*g*)).

FIG. 29 comprises simplified side views for illustrating the changing operation of a disc to be reproduced of the conventional disc player 50.

FIG. 29(*a*) shows a state of reproducing the fifth disc 53 from the bottom in the similar condition to that of FIG. 28(*g*). When the user gives a command to reproduce the fourth disc 53 in this state, the locking shaft 61*b* is fixed with the locking member 61*a*, so that the floating state of the turntable unit 64 is cleared. The turntable lifting slide plates and the division slide plates 57 are caused to slide, the turntable unit 64 and the fifth stocker 81 on which the disc 53 was previously set are caused to rise, and the disc 53 is set on the disc receiver 81*b* of the fifth stocker 81.

The catching mechanism of the turntable unit 64 is activated so as to clear the state of clamping the disc 53 (FIG. 29(*c*)). Then, the turntable unit 64 is moved downward and the disc 53 is taken from the turntable 64*a* onto the fifth stocker 81 (FIG. 29(*d*)).

The turntable unit 64 is horizontally moved to under the insert/eject mechanism 73 (FIG. 29(*e*)), and then, all the divided stockers 81 are caused to descend, so that all the stockers 81 are piled up, resulting in reset of the divided state (FIG. 29(*f*)).

In the state of all the stockers 81 in piles, the stockers 81 are divided into the upper part including the selected fourth stocker 81 and the stockers 81 thereabove, and the lower part constituted of the stockers 81 below the selected fourth stocker 81 (FIG. 29(*g*)). The turntable unit 64 is moved into the space between the third and fourth stockers 81 (FIG. 29(*h*)).

The turntable unit 64 is moved upward, a disc 53 to be reproduced is placed on the turntable 64*a*, and the catching mechanism of the turntable unit 64 is activated so as to clamp the disc 53 (FIG. 29(*i*)). Then, the locking shaft 61*b* fixed with the locking member 61*a* is released so as to make the turntable unit 64 in a mechanically floating state, the fourth stocker 81 on which the disc 53 was previously set is moved downward, and the reproduction of the selected fourth disc 53 is started (FIG. 29(*j*)).

When the user carelessly inserts two discs 53 successively in the insertion of the disc 53 shown in FIG. 28(*b*), the conventional disc player 50 senses the successive insertion and tries to eject the second disc 53 by fail-safe function. However, if the user tries to push in the second disc 53 further against the ejecting operation, the first disc 53 previously inserted is pushed forward from its positioned place. In this case, the disc 53 cannot be placed on the turntable 64*a* on standby at the prescribed standby position shown in FIG. 28(*d*), and moreover, the disc 53 falls to the stocker 81 side.

In the conventional disc player 50, since the thus fallen disc 53 widely moves in the unoccupied space inside the system, the fallen disc 53 cannot be placed on the turntable 64*a* again. As a result, the disc 53 is held in a dislocated state from the stocker 81 and cannot be ejected through the disc insert/eject slot 54*a*.

If the disc 53 is held in the dislocated state from the stocker 81, the disc player 50 recognizes that no disc 53 is set on the stocker 81. Therefore, when the next disc 53 is inserted, an attempt to set the disc 53 again on the stocker 81 with the disc 53 dislocated therefrom is made. As a result, two discs are stacked, so that the system gets clogged with them so as to become inoperable.

In the conventional disc player 50, when vibration or shock stronger than the allowable values is applied thereto during the disc reproduction shown in FIG. 28(*g*) or FIG. 29(*j*), the disc 53 set on the top stocker 81 of the lower part (the fourth from the bottom in FIG. 28(*g*), while the third from the bottom in FIG. 29(*j*)) is sometimes dislocated from the stocker 81.

However, in the conventional disc player 50, once the disc 53 is dislocated from the stocker 81, it widely moves inside the system as it is in the dislocated state, and it is impossible to return the disc 53 to its original normal position. Therefore, the disc 53 cannot be placed on the turntable 64*a*, and the disc 53 dislocated from the stocker 81 cannot be ejected through the disc insert/eject slot 54*a*, similarly to the above case.

In the conventional disc player 50, when strong vibration or shock is applied thereto during the dividing operation of the stockers 81 (the operation proceeding from FIG. 29(*f*) to FIG. 29(*g*)) in changing of the disc 53 to be reproduced and the like, the locations of the division projections 81*f* in the right and left side portions of the stocker 81 in engagement with the division slide plates 57 sometimes become different from each other. As a result, the stocker 81 gets inclined and the dividing operation is interrupted, so that the system becomes inoperable.

When thus failing to divide the stockers 81, the disc 53 is dislocated from the stocker 81 and falls out of the stocker 81, so that it cannot be ejected through the disc insert/eject slot 54*a*, similarly to the above cases.

In cases where the disc 53 cannot be taken out, or in cases where the system becomes inoperable, troublesome activities of removing the disc player 50 from the vehicle, disassembling it, taking out the disc 53 blocking inside the system, reassembling the disc player 50, and mounting it on the vehicle, must be conducted.

SUMMARY OF THE INVENTION

The present invention was developed in order to solve the above problems, and it is an object of the present invention to provide a disc player, whereby even when an inserted disc is not normally set on a stocker, or a normally set disc is dislocated from a stocker, the disc can be reset in the normal position on the stocker during a stocker lifting/division operation, so that the normal operating condition can be quickly recovered without troublesome removing activities.

In order to achieve the above object, a disc player (1) according to the present invention is characterized by a disc player comprising multiple disc setting devices for stocking discs and a lifting division device to lift up and down and divide these disc setting devices, which comprises a movement control device to control the movement of a disc unexpectedly dislocated from the disc setting device.

Using the above disc player (1), the movement of a disc unexpectedly dislocated from the disc setting device with vibration or the like can be controlled by the movement control device. For example, through the lifting/division operation of the disc setting devices by a driving control device, the disc can be set in the normal position on the disc setting device. Therefore, even when an inserted disc is not normally set on the disc setting device, or a normally set disc is dislocated from the disc setting device, it is possible to prevent the occurrence of problems that the disc cannot be ejected from the system or that the system becomes inoperable. As a result, without troublesome removing activities, the normal operating condition can be quickly recovered.

A disc player (2) according to the present invention is characterized by the movement control device, comprising a first disc guide which is inserted through an insertion hole formed in the periphery of the disc setting device, being arranged in a direction almost orthogonal to the disc plane in the above disc player (1).

Using the above disc player (2), even when an inserted disc is not normally set on the disc setting device, or a normally set disc is dislocated from the disc setting device, it is possible to conduct the position control with the first disc guide in such a manner that the disc does not move outward from the periphery of the disc setting device, resulting in a narrow movement range of the disc.

A disc player (3) according to the present invention is characterized by the first disc guide, having a step portion formed in such a manner that the upper portion above a prescribed position is farther away from the central axis of a disc set on the disc setting device than the lower portion in the above disc player (2).

In the above disc player (3), the step portion is formed in the first disc guide. Therefore, when a disc is reproduced above the disc setting devices, it is possible to prevent the disc in reproduction and the first disc guide from coming into contact with each other.

A disc player (4) according to the present invention is characterized by comprising a slide chassis to horizontally move a disc carrying device on which a turntable and a pickup are mounted to a prescribed position, and the movement control device comprising a second disc guide arranged at a prescribed place on the disc setting device side of the slide chassis in any of the above disc players (1)–(3).

In the above disc player (4), the movement control device comprises the second disc guide arranged at a prescribed place on the disc setting device side of the slide chassis. Therefore, for example, even when an inserted disc is not normally set on the disc setting device, or a disc is dislocated from the disc setting device because the disc setting devices fail to be normally divided during the lifting/division operation of the disc setting devices, it is possible to control the movement of the dislocated disc toward the slide chassis side above the slide chassis.

Therefore, the movement of the disc outward from the second disc guide can be reliably inhibited, resulting in a narrow movement range of the disc. As a result, it becomes easy to set the dislocated disc in the normal position on its original disc setting device through the lifting/division operation.

A disc player (5) according to the present invention is characterized by comprising a mount chassis arranged below the slide chassis to lift up and down the slide chassis, and the movement control device comprising a third disc guide arranged at a prescribed place on the disc setting device side of the mount chassis in any of the above disc players (1)–(4).

In the above disc player (5), the movement control device comprises the third disc guide arranged at a prescribed place on the disc setting device side of the mount chassis. Therefore, for example, even when a disc is dislocated from the disc setting device because the disc setting devices fail to be normally divided during the lifting/division operation of the disc setting devices, or a disc is dislocated from the disc setting device with vibration or the like during disc reproduction, it is possible to control the movement of the dislocated disc toward the mount chassis side below the slide chassis.

Therefore, the movement of the disc outward from the third disc guide can be reliably inhibited, resulting in a narrow movement range of the disc. As a result, it becomes easy to set the dislocated disc in the normal position on its original disc setting device through the lifting/division operation.

A disc player (6) according to the present invention is characterized by the third disc guide, which is formed by upwardly bending part of the mount chassis in the above disc player (5).

Using the above disc player (6), since it is not necessary to mount new parts thereon, the assembling process thereof can be simplified.

A disc player (7) according to the present invention is characterized by the disc setting device comprising an antifalling device to prevent the falling of a disc from the disc setting device in any of the above disc players (1)–(6).

In the above disc player (7), the disc setting device comprises the antifalling device. Therefore, the falling of a disc from the disc setting device can be inhibited, so that it is possible to prevent the disc from getting caught in a state of being laid across multiple disc setting devices. Therefore, the lifting/division operation for normally setting the disc in the normal position on its original disc setting device can be normally conducted.

A disc player (8) according to the present invention is characterized by the antifalling device, which is formed by extending a disc receiver of the disc setting device in the direction of the center of a disc to be set on the disc setting device in the above disc player (7).

In the above disc player (8), the antifalling device is formed by extending a disc receiver of the disc setting device in the direction of the center of a disc to be set on the disc setting device. Therefore, for example, even when a disc is inserted in an inclined state relative to the disc setting device, or a disc is dislocated from the disc setting device with vibration or the like so as to get inclined, the falling of the disc from the disc setting device can be reliably inhibited.

A disc player (9) according to the present invention is characterized by a tapered portion to guide a disc in a state of dislocated from the normal position on the disc setting device to the normal position in piling the disc setting devices by lifting and division, which is formed in the periphery of the disc setting device in any of the above disc players (1)–(8).

In the above disc player (9), the tapered portion is formed in the periphery of the disc setting device. Therefore, it is possible to push in a disc in a state dislocated from the normal position on the disc setting device along the tapered portion during piling of the disc setting devices in the lifting/division operation, so that the disc can be reliably guided to the normal position.

A disc player (10) according to the present invention is characterized by the tapered portion, which also serves as an antifloating device for preventing a disc set on the disc setting device from floating in the above disc player (9).

Using the above disc player (10), since the tapered portion also serves as the antifloating device, the antifloating device can be allowed to have the two functions simply by changing the processing shape thereof.

DESCRIPTION OF THE PREFERRED EMBODIMENTS

Figure 1:
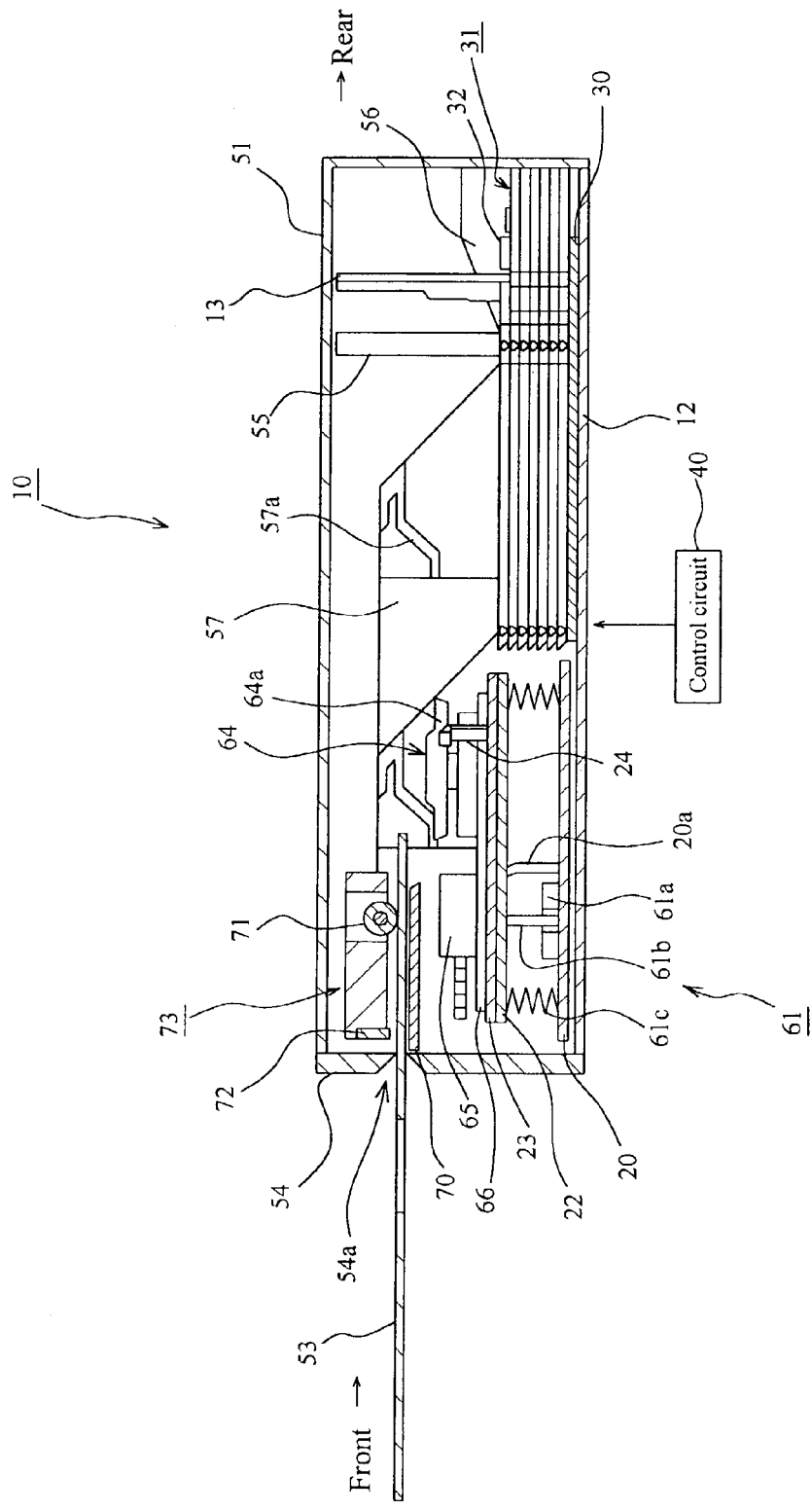
FIG. 1 is a sectional side view schematically showing the construction of a disc player according to an embodiment of the present invention.
Figure 2:
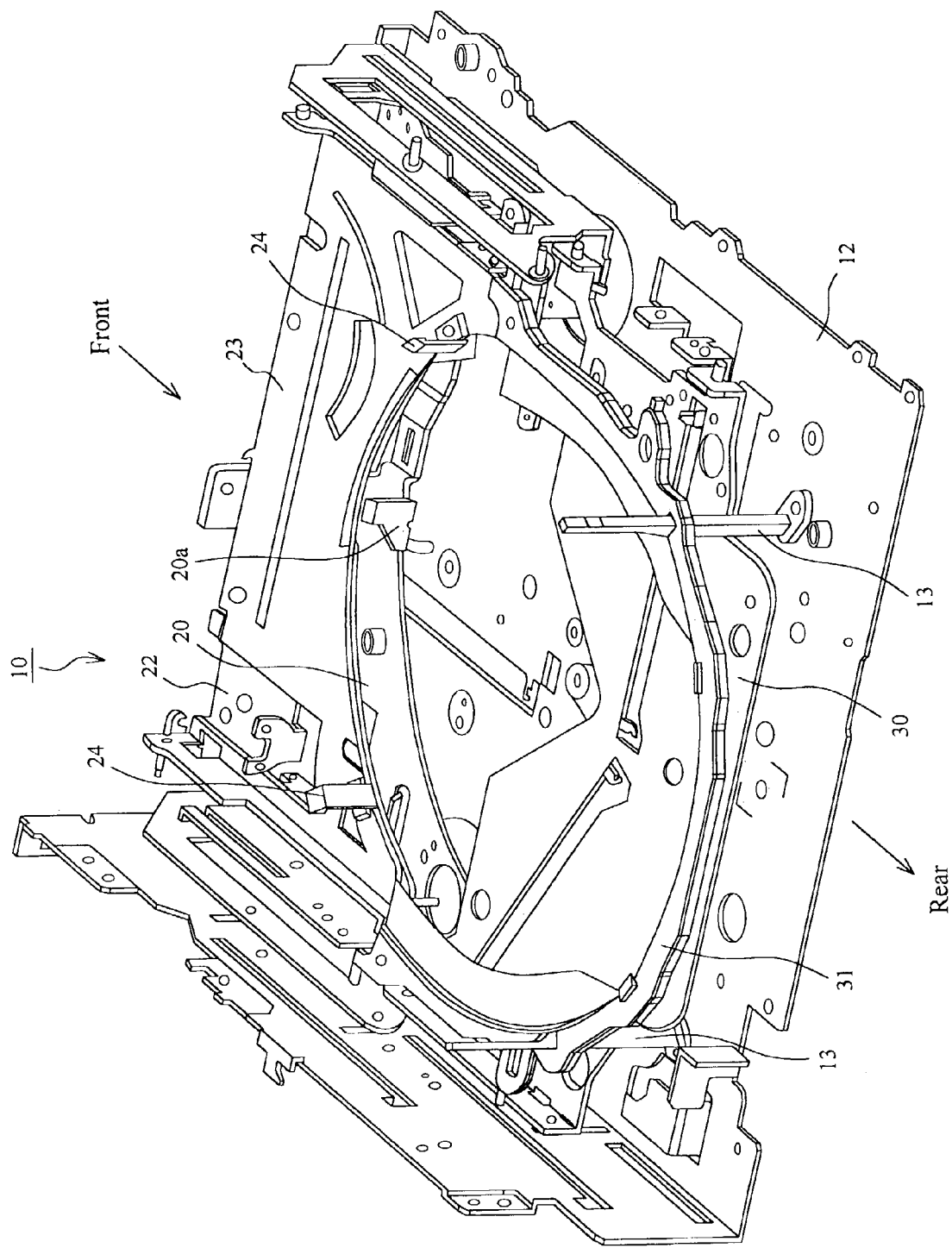
FIG. 2 is a perspective view showing the construction of a distinctive part of the disc player according to the embodiment.

The preferred embodiments of the disc player according to the present invention are described below by reference to those Figures. FIG. 1 is a sectional side view schematically showing the construction of a disc player according to an embodiment. FIG. 2 is a diagram showing a distinctive part of the disc player shown in FIG. 1, which is a perspective view seen from the rear side of FIG. 1. Here, the same marks are affixed to component parts having the same functions as those of a conventional disc player 50 shown in FIG. 26.

The significant differences between the disc player according to the embodiment and the conventional disc player 50 are that disc guides 13, 20$a$ and 24 are newly arranged, that the construction of a stocker 31 is modified, and that the shape of each part is altered in response to the arrangement of the disc guides 13, 20$a$ and 24.

Reference numeral 10 in the figure represents a disc player. Above the forward portion of a main chassis 12 constituting the disc player 10, a mount chassis 20 which can be displaced up and down by engagement thereof with turntable lifting slide plates (not shown) slidably mounted on the sidewalls of the main chassis 12 is arranged.

On the mount chassis 20, a disc guide 20$a$ for controlling the forward movement of a disc 53 dislocated from a stocker 31 is formed. On the mount chassis 20, a floating chassis 22 is arranged through a floating mechanism 61.

On the floating chassis 22, a slide chassis 23 is mounted in such a manner as to be slidable in a back-and-forth direction relative to the floating chassis 22.

On the slide chassis 23, disc guides 24 for controlling the forward movement of the disc 53 dislocated from the stocker 31, and a swing board 66 with a turntable unit 64 and a PU unit 65 mounted thereon are placed. Above the swing board 66, an insert/eject mechanism 73 is arranged.

At prescribed places in the rearward portion of the main chassis 12, a couple of lifting guides 55 and a couple of disc guides 13 are vertically mounted. On the main chassis 12, a stocker bottom board 30, six stockers 31 for setting discs 53 thereon and a stocker top board 32 in ascending order are laminated with the lifting guides 55 inserted through insertion holes 30c, 31f and 32c formed therein, respectively, and the disc guides 13 inserted through insertion holes 31g formed in each periphery 31a of the stockers 31.

On the sidewalls of the main chassis 12, lifting slide plates 56 with step-like lifting grooves (not shown) formed thereon are slidably mounted along the sidewalls, so that with the movement of the lifting slide plates 56, the stocker bottom board 30 is lifted up and down.

On the sidewalls of the main chassis 12, division slide plates 57 with division grooves 57a formed thereon are slidably mounted along the sidewalls, so that with the movement of the division slide plates 57, the stockers 31 and the stocker top board 32 are divided into the upper and lower parts.

A control circuit 40, conducting driving control of each section, which is mounted on a substrate, is arranged on the outside wall of the main chassis 12.

Figure 26:
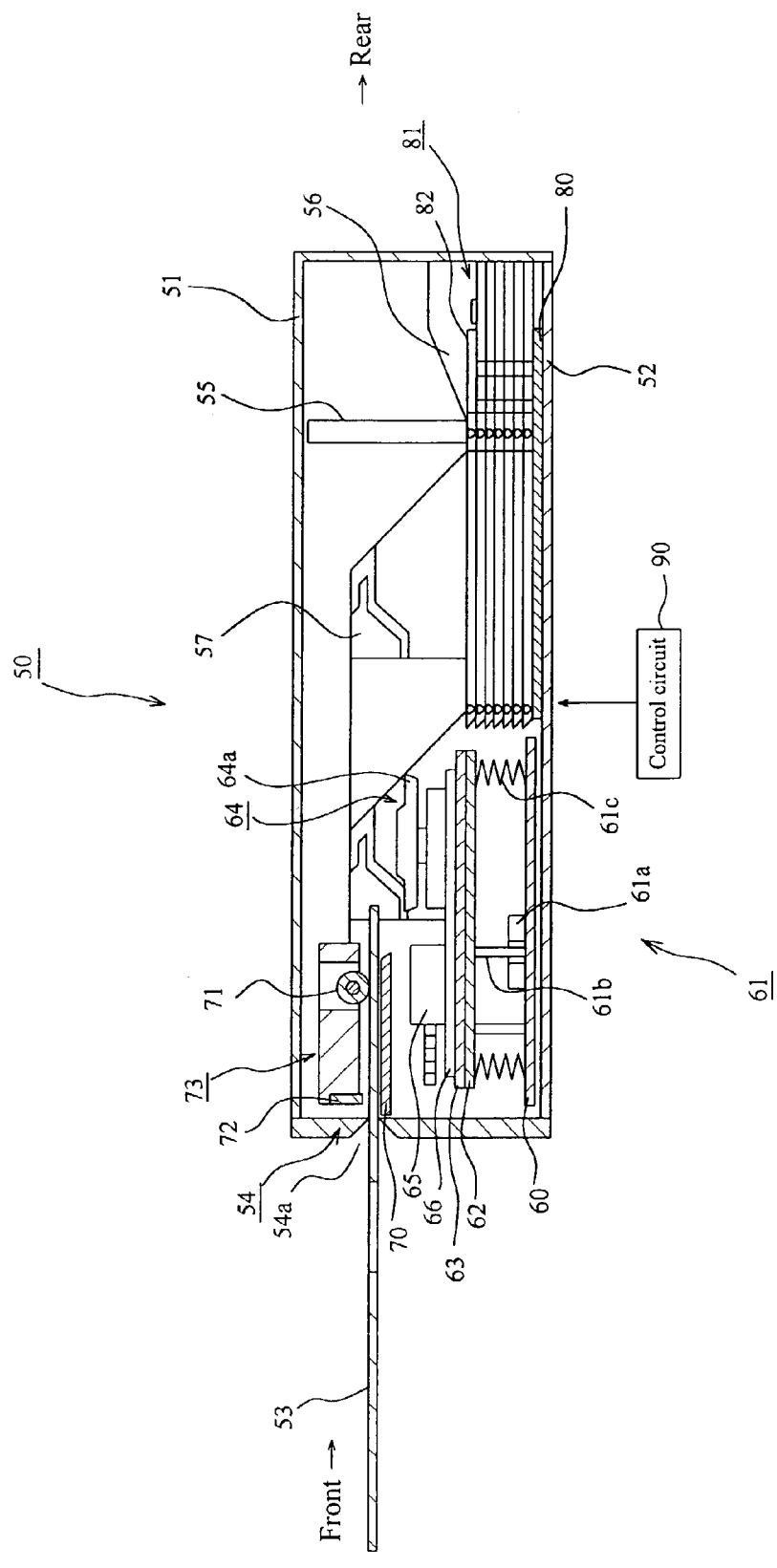
FIG. 26 is a sectional side view schematically showing the construction of a conventional disc player.
Figure 27A:
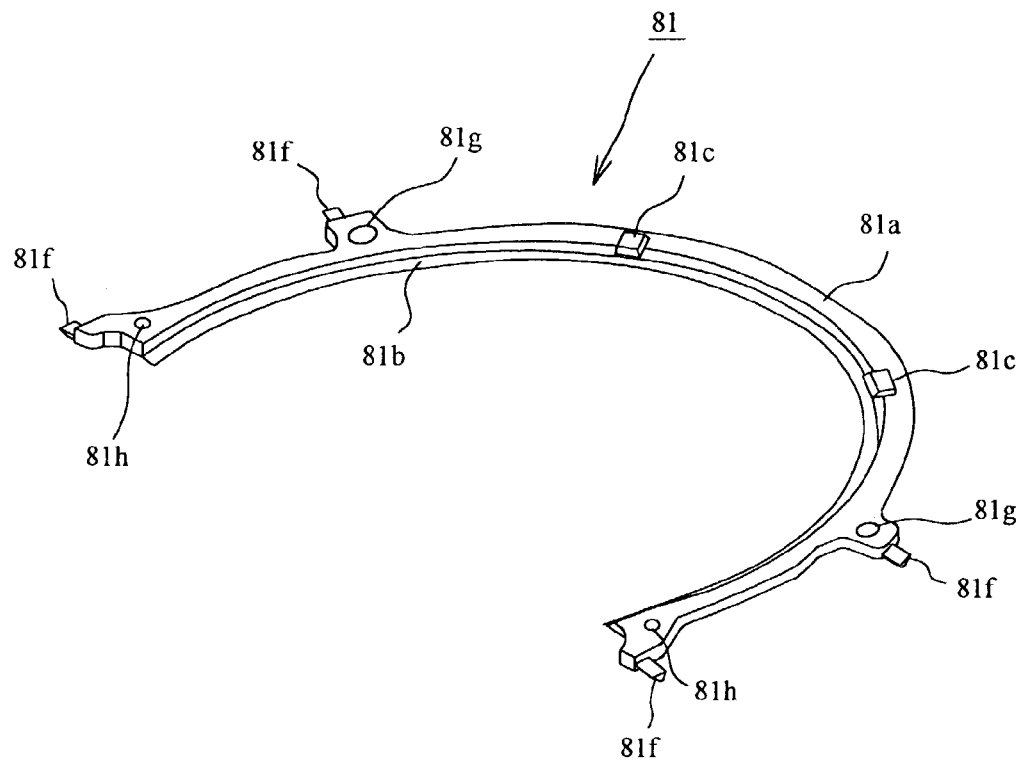
FIGS. 27($a$)–($b$) are diagrams schematically showing the construction of a stocker of the conventional disc player, wherein FIG. 27($a$) is a perspective view, while FIG. 27($b$) is an enlarged fragmentary view showing an antifloating claw and its vicinity.
Figure 27B:
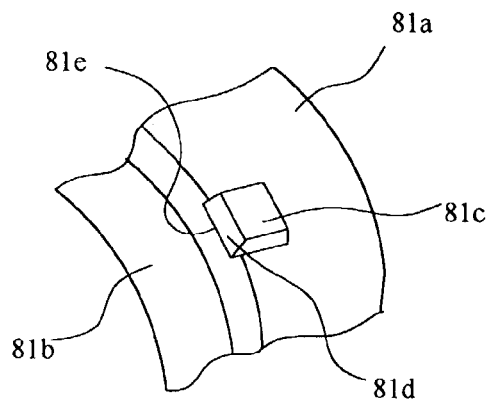
Figure 28A:
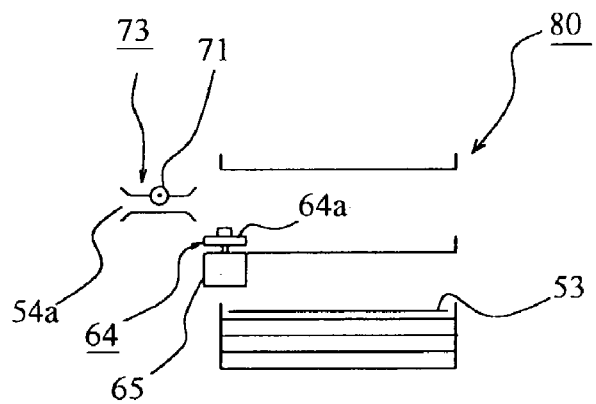
FIGS. 28($a$)–($g$) are simplified side views showing the operation during disc insertion in the conventional disc player.
Figure 28E:
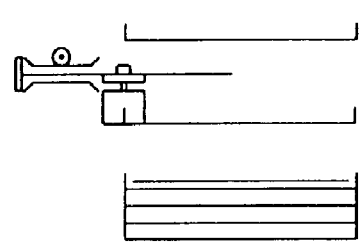
Figure 28B:
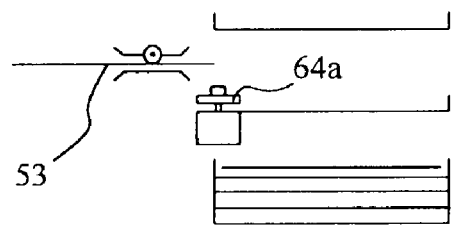
Figure 28F:
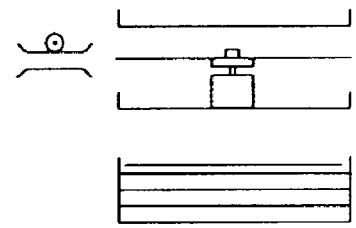
Figure 28C:
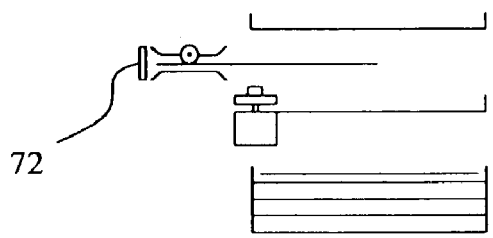
Figure 28G:
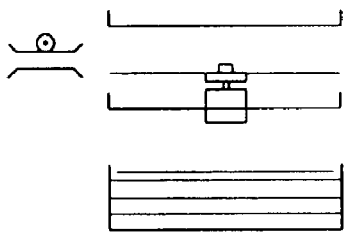
Figure 28D:
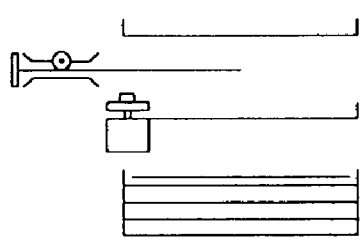
Figure 29A:
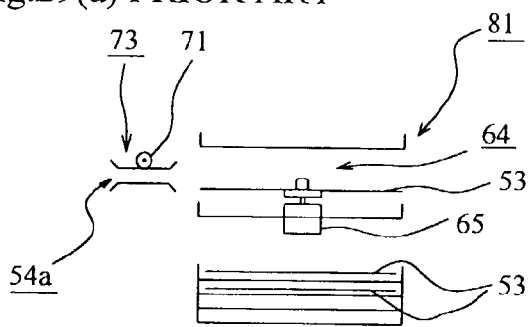
FIGS. 29($a$)–($j$) are simplified side views showing the operation during disc changing and reproduction in the conventional disc player.
Figure 29F:
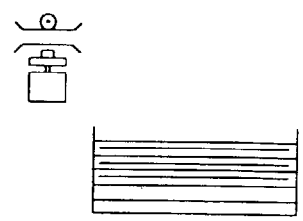
Figure 29B:
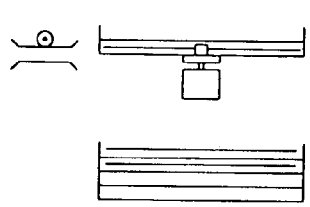
Figure 29G:
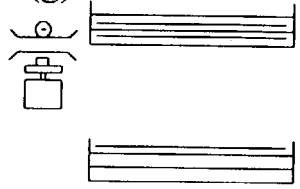
Figure 29C:
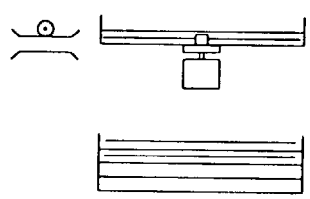
Figure 29H:
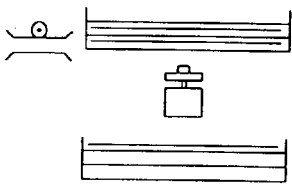
Figure 29D:
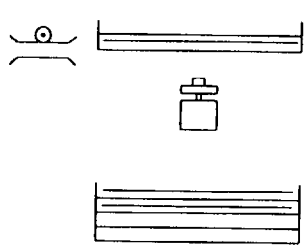
Figure 29I:
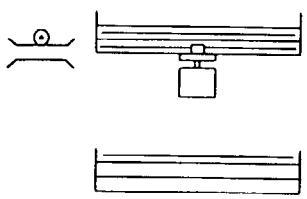
Figure 29E:
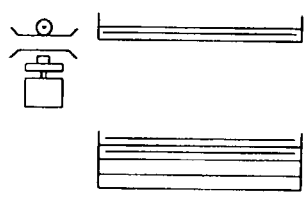
Figure 29J:
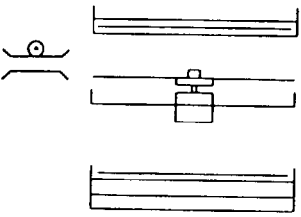

The distinctive portions of each component part of the disc player 10 are described below. Here, the differences from the conventional disc player 50 shown in FIG. 26 are chiefly mentioned.

Figure 3:
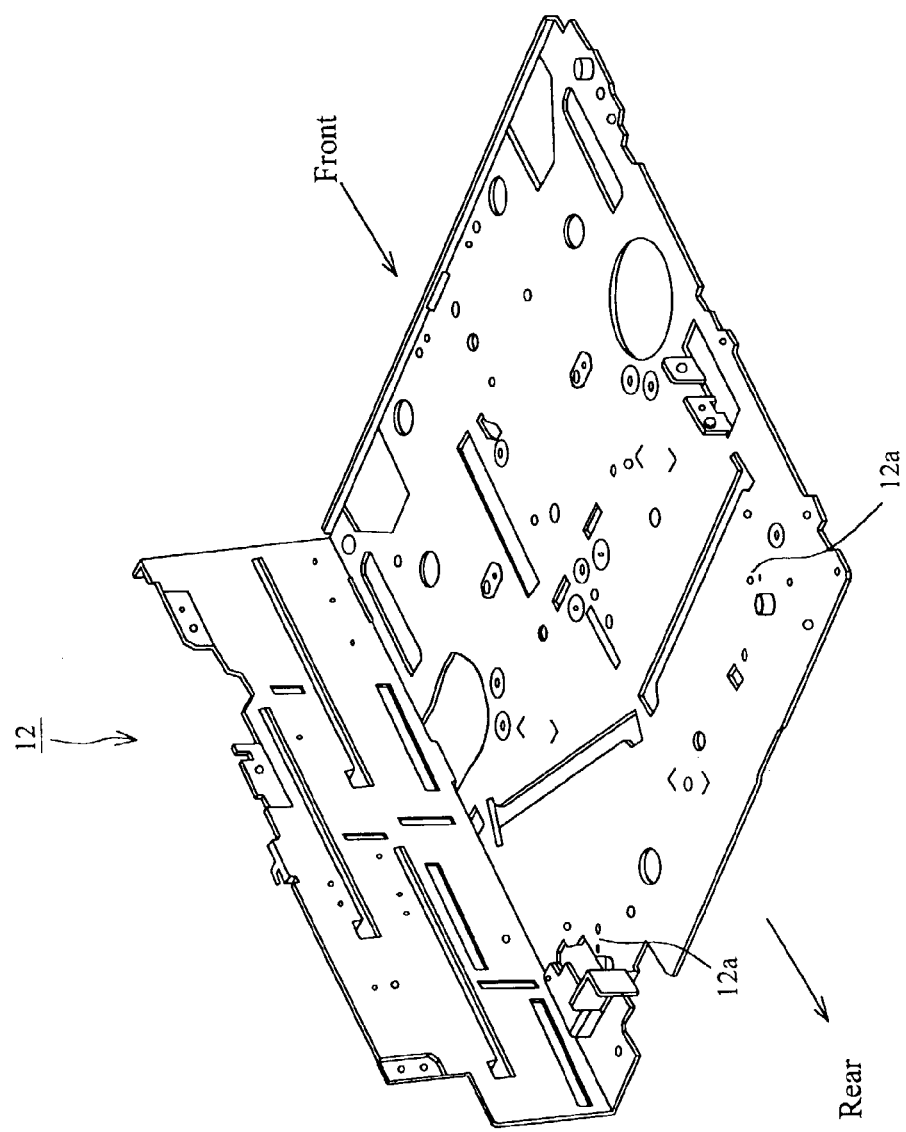
FIG. 3 is a perspective view schematically showing the construction of a main chassis of the disc player according to the embodiment.

FIG. 3 is a perspective view schematically showing the construction of the main chassis 12.

At prescribed places in the rearward portion of the main chassis 12, a couple of mounting holes 12a for mounting the disc guides 13 are formed.

Figure 4:
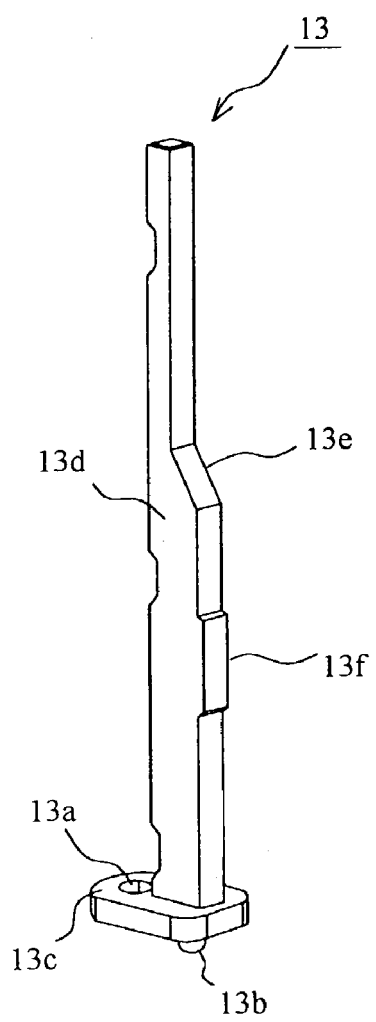
FIG. 4 is a perspective view schematically showing the construction of a disc guide of the disc player according to the embodiment.

FIG. 4 is a perspective view schematically showing the construction of the disc guide 13 set in the mounting hole 12a.

The disc guide 13 comprises a guide supporting portion 13c with a screw hole 13a and an extruded pin 13b, and an almost quadrangular-prism-like guide portion 13d almost vertically standing on the guide supporting portion 13c. In the guide portion 13d, a step portion 13e is formed in such a manner that the upper portion above a prescribed position is farther away from the central axis of a disc 53 set on the stocker 31 than the lower portion.

The prescribed position in which the step portion 13e is formed is predetermined so as to be lower than the position of a disc 53 in reproduction. The size of the step of the step portion 13e is selected in consideration of the runout width of the disc 53 in reproduction and the like so that the disc 53 and the guide portion 13d do not come into contact with each other during reproduction.

At a prescribed position in the lower part of the guide portion 13d, a convex portion 13f is formed so that it is located on the almost same plane as the inner wall of the periphery 31a of the stocker 31 in mounting.

Figure 5:
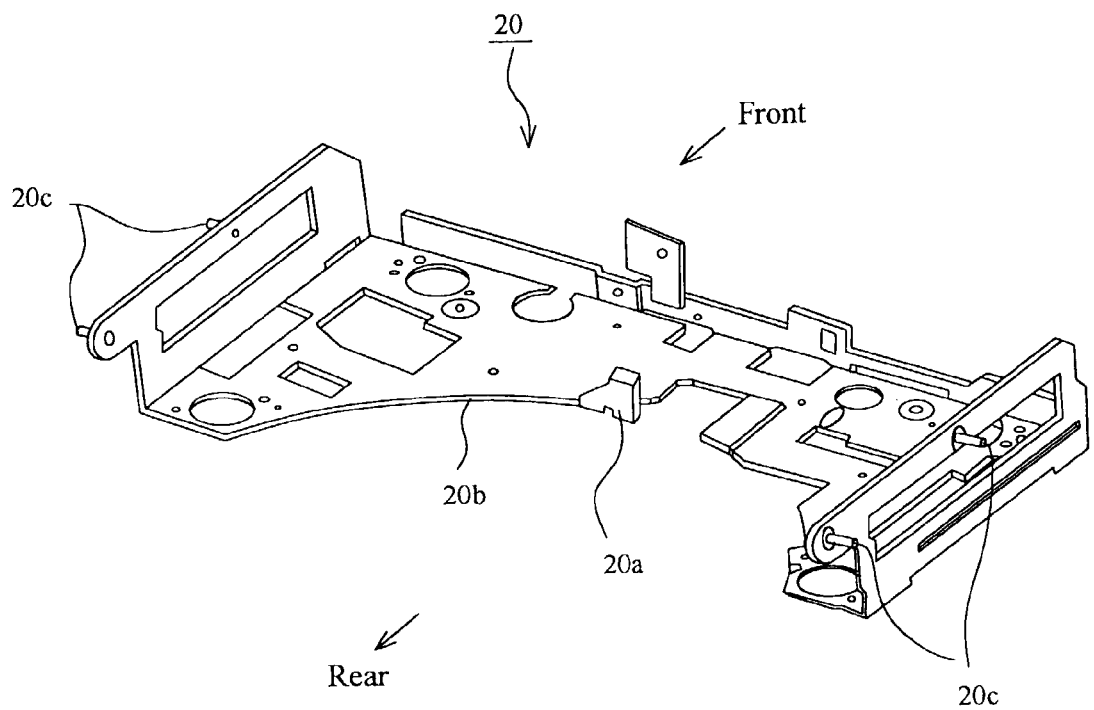
FIG. 5 is a perspective view schematically showing the construction of a mount chassis of the disc player according to the embodiment.

FIG. 5 is a perspective view schematically showing the construction of the mount chassis 20.

The mount chassis 20 comprises a recessed portion 20b whose rear part is concavely formed in the form of an almost semicircular arc in accordance with the disc shape, and a disc guide 20a formed by upwardly bending part of the mount chassis 20 located near the center of the recessed portion 20b. The height of the disc guide 20a is selected to be almost the same as the floating chassis 22 arranged above the mount chassis 20 so that a disc 53 does not enter between the floating chassis 22 and the mount chassis 20.

On both sidewalls of the mount chassis 20, lifting projections 20c to be brought into engagement with the turntable lifting slide plates (not shown) which allow the mount chassis 20 to be displaced up and down, interlocking with the division slide plates 57, are placed.

Figure 6:
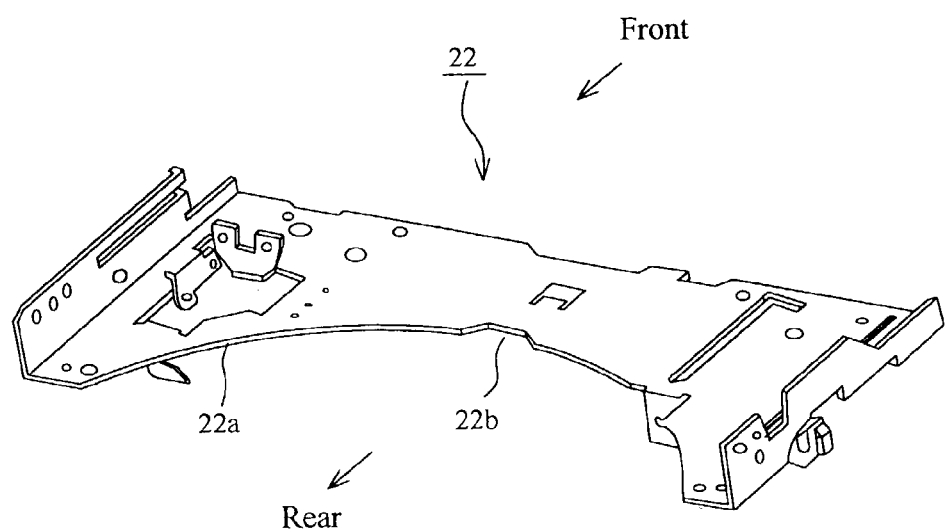
FIG. 6 is a perspective view schematically showing the construction of a floating chassis of the disc player according to the embodiment.

FIG. 6 is a perspective view schematically showing the construction of the floating chassis 22.

In the rear portion of the floating chassis 22, a recessed portion 22a is formed in the form of an almost semicircular arc in accordance with the disc shape, and in the position overlapping the disc guide 20a of the mount chassis 20, a notch 22b to be a clearance for the disc guide 20a is formed.

Figure 7:
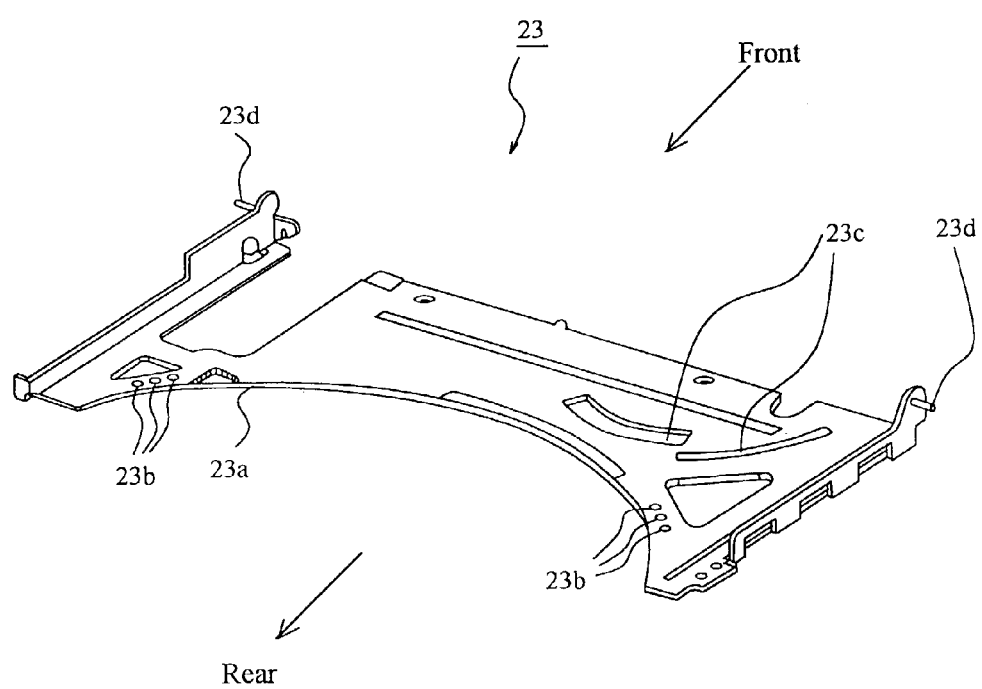
FIG. 7 is a perspective view schematically showing the construction of a slide chassis of the disc player according to the embodiment.

FIG. 7 is a perspective view schematically showing the construction of the slide chassis 23.

In the rear portion of the slide chassis 23, a recessed portion 23a is formed in the form of an almost semicircular arc in accordance with the disc shape, and at prescribed places in the recessed portion 23a (places where no disc guides can be a hindrance to the swinging displacement of the swing board 66), mounting holes 23b for mounting disc guides 24 are formed. And arc-like guide grooves 23c for guiding in the swinging displacement of the swing board 66 are formed, and slide positioning projections 23d are fixed on both sidewalls of the forward portion.

Figure 8:
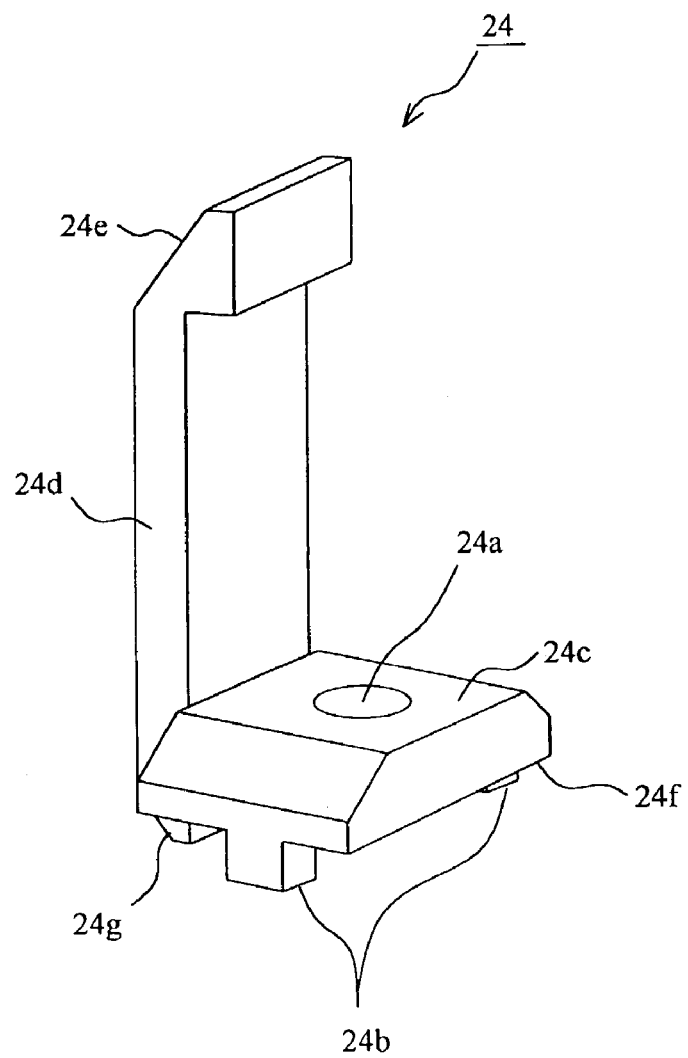
FIG. 8 is a perspective view schematically showing the construction of a disc guide of the disc player according to the embodiment.

FIG. 8 is a perspective view schematically showing the construction of the disc guide 24.

The disc guide 24 comprises a guide supporting portion 24c with a screw hole 24a and extruded pins 24b formed thereon, and a guide portion 24d almost vertically formed along a sidewall of the guide supporting portion 24c. In the upper part of the guide portion 24d, a tapered plane 24e is formed, while in the lower part thereof, an extended portion 24g, which is downwardly extended from the bottom 24f of the guide supporting portion 24c, is formed.

The disc guide 24 is set in the mounting holes 23b with the guide portion 24d facing inward (to the rear side) so that the extended portion 24g in the lower part of the guide portion 24d fits on the recessed portion 23a of the slide chassis 23.

Figure 9:
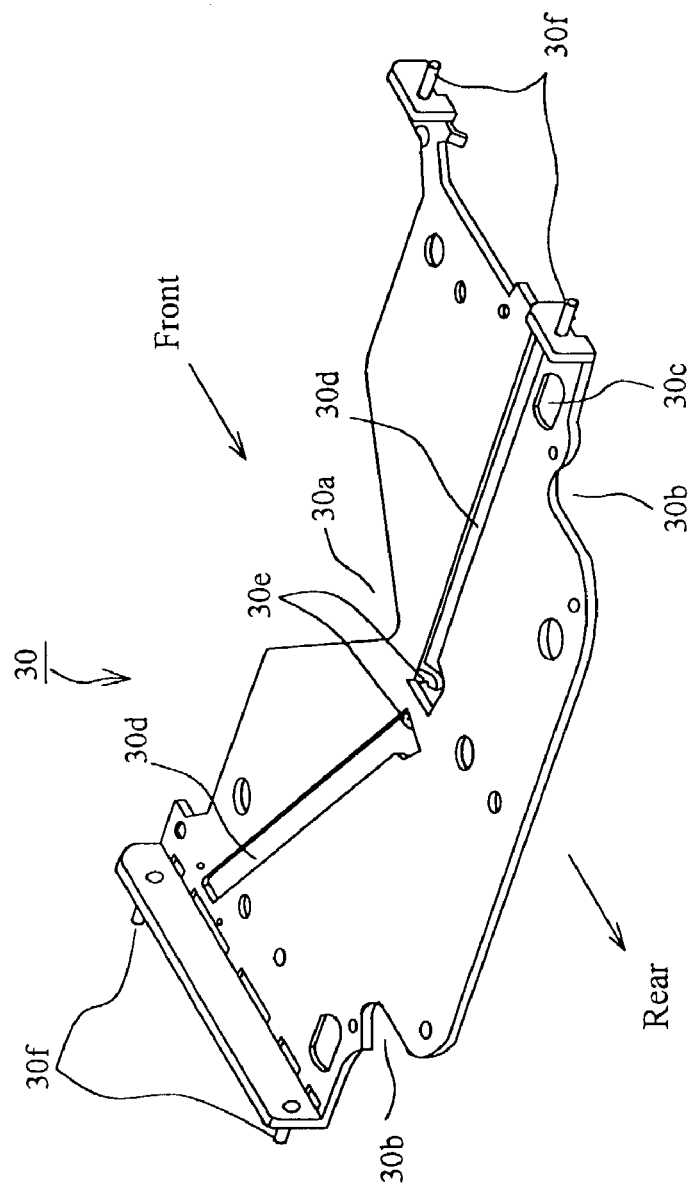
FIG. 9 is a perspective view schematically showing the construction of a stocker bottom board of the disc player according to the embodiment.

FIG. 9 is a perspective view schematically showing the construction of the stocker bottom board 30.

The stocker bottom board 30 is formed approximately in the form of a rectangle in such a manner as to be able to hold the stockers 31 almost horizontally, except for a notch 30a in the center portion of the forward part thereof and notches 30b to be a clearance in the position overlapping the disc guide 13. Insertion holes 30c for inserting the lifting guides 55 therethrough, passage holes 30d to be a passage of a coil spring connected to the stocker top board 32, and spring hooks 30e for hooking the coil springs are formed thereon. At four places on both side portions of the stocker bottom board 30, lifting projections 30f for vertical displacement in engagement with step-like lifting grooves formed on the lifting slide plates 56 are fixed.

Figure 10A:
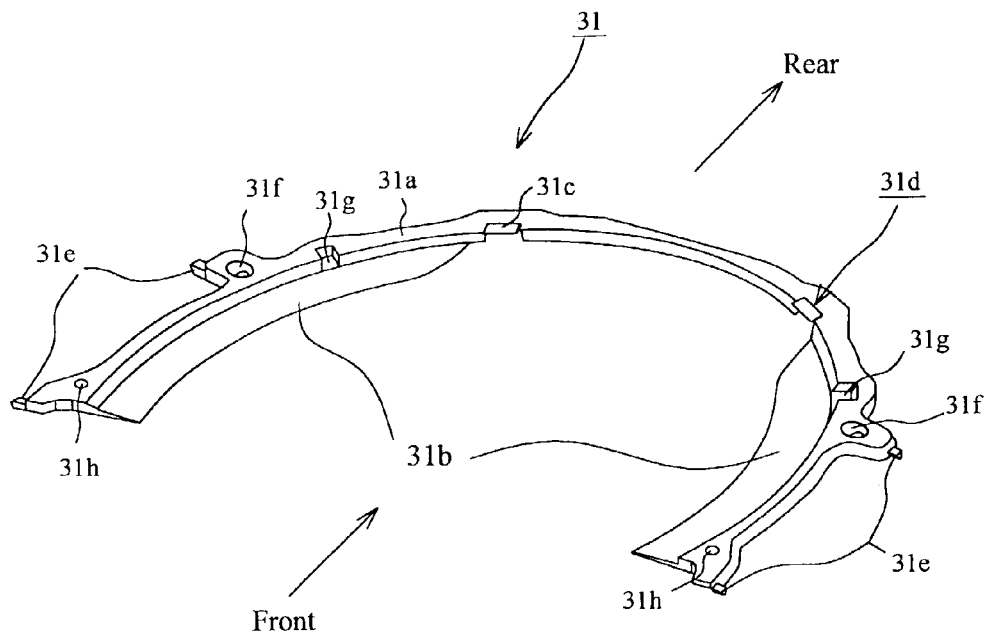
FIGS. 10($a$)–($b$) are diagrams schematically showing the construction of a stocker of the disc player according to the embodiment, wherein FIG. 10($a$) is a perspective view, while FIG. 10($b$) is an enlarged fragmentary view showing an antifloating claw and its vicinity.
Figure 10B:
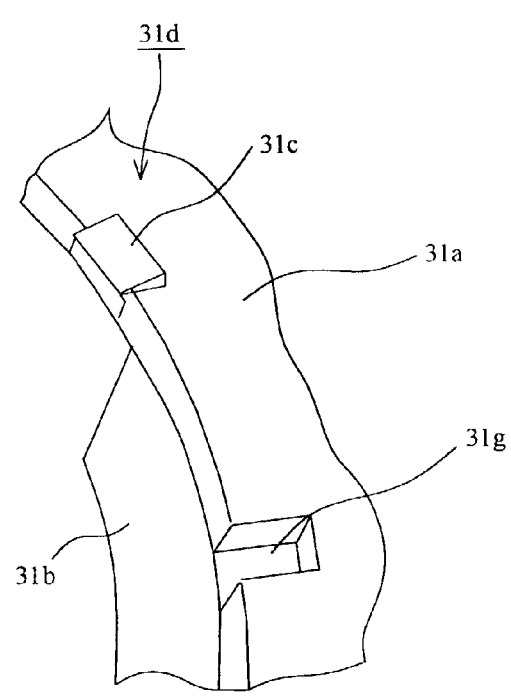

FIG. 10 comprises diagrams schematically showing the construction of the stocker 31, wherein FIG. 10(a) is a perspective view, while FIG. 10(b) is an enlarged fragmentary view showing an antifloating claw and its vicinity.

The stocker 31 comprises a periphery 31a formed in the form of an almost semicircular arc so as to surround the outer regions of a disc 53, and a widely formed disc receiver 31b having a function of supporting the outer regions of a disc 53 and a function of preventing a dislocated disc 53 from falling.

In the rear portion of the periphery 31a, an antifloating claw 31d having a wide tapered plane 31c on the top thereof is formed so as to be inwardly convex from the inner wall of the periphery 31a. On both side portions of the periphery 31a, division projections 31e for division in engagement with division grooves 57a of the division slide plates 57, a couple of insertion holes 31f for inserting the lifting guides 55 therethrough, and a couple of insertion holes 31g for inserting the disc guides 13 therethrough are formed. The insertion holes 31g are formed approximately in the form of a rectangle so that one side thereof overlaps the inner wall plane of the periphery 31a. On both end portions of the periphery 31a, dislocation preventive projections 31h for preventing the dislocation of the stockers 31 in piling are formed.

Figure 11:
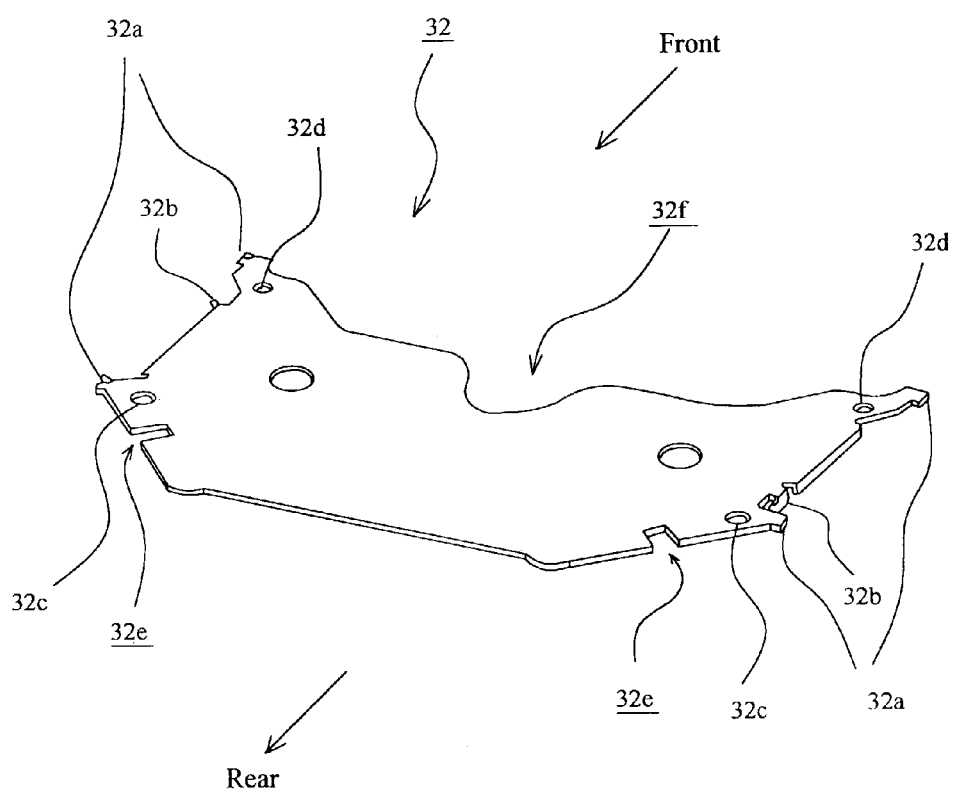
FIG. 11 is a perspective view schematically showing the construction of a stocker top board of the disc player according to the embodiment.

FIG. 11 is a perspective view schematically showing the construction of the stocker top board 32.

The stocker top board 32 is formed in such a manner as to be able to retain the surface of a disc 53 set on the uppermost stocker 31. On both side portions thereof, division projections 32a corresponding to the division projections 31e of the stocker 31, and spring hooks 32b for hooking one end of the coil spring caught with the spring hook 30f of the stocker bottom board 30, are formed.

On the stocker top board 32, a couple of insertion holes 32c for inserting the lifting guides 55 therethrough, dislocation preventive holes 32d to be brought into engagement with the dislocation preventive projections 31h of the uppermost stocker 31, notches 32e to be a clearance in the position overlapping the disc guide 13, and a notch 32f in the center portion are formed.

The main operation of the disc player 10 according to the embodiment is described below.

The operation of the disc player 10 in cases where an inserted disc 53 is not set in the normal position on a selected stocker 31 during disc insertion operation is described below by reference to sectional side views shown in FIGS. 12–17.

Figure 12:
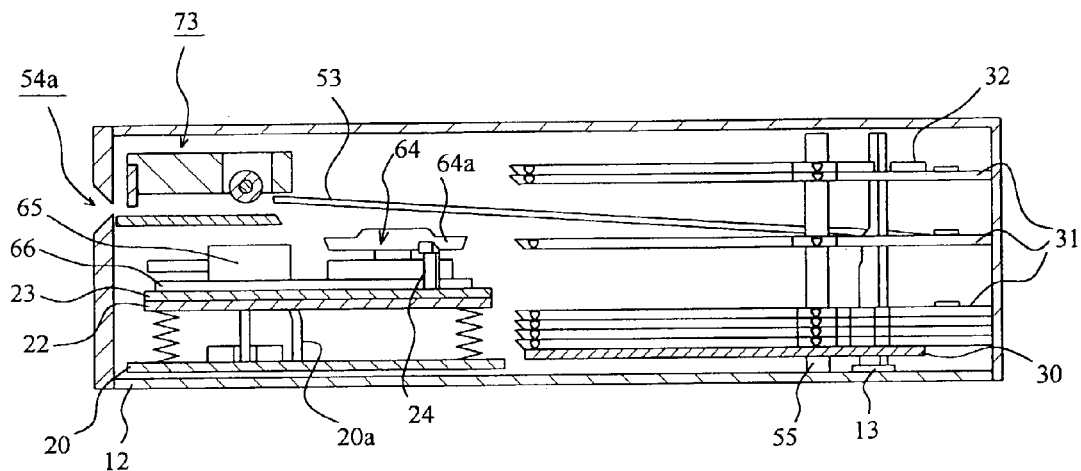
FIG. 12 is a sectional side view showing the operation during disc insertion in the disc player according to the embodiment.

FIG. 12 shows the situation wherein, in an insertion standby state where a command to set a disc 53 on the fifth stocker 31 from the bottom is given by the user, the user carelessly tries to insert two discs 53 successively, so that without being positioned by the insert/eject mechanism 73, the first disc 53 is pushed out toward the stocker 31 side.

The pushed-out disc 53 falls onto the selected fifth stocker 31. At this time, since the disc receiver 31b of the stocker 31 is widely formed by extending in the direction of the center of the disc, the disc 53 never falls below the fifth stocker 31 and rests on the disc receiver 31b of the fifth stocker 31.

Figure 13:
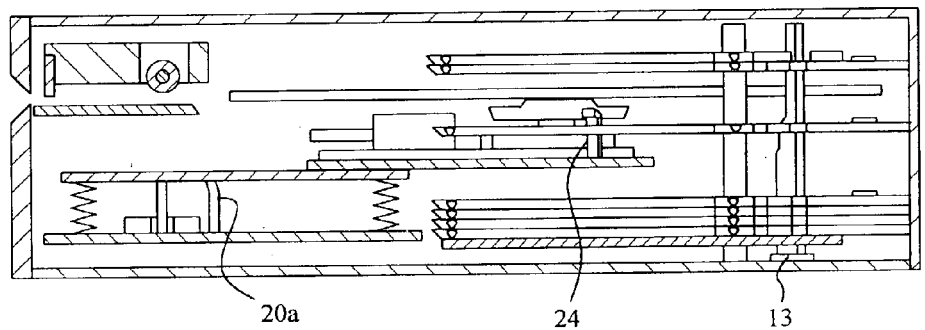
FIG. 13 is a sectional side view showing the operation during disc insertion in the disc player according to the embodiment.

In this situation, it is impossible to place the disc 53 on the turntable 64a, but after a fixed timing, the turntable unit 64 is horizontally moved toward the stocker 31 side (FIG. 13). At this time, the fallen disc 53 is pushed and moved toward the stocker 31 side in a state of being mounted on the turntable 64a. However, with the disc guide 13, the position of the disc 53 is controlled so that it cannot move outward from the periphery 31a of the stocker 31.

Figure 14:
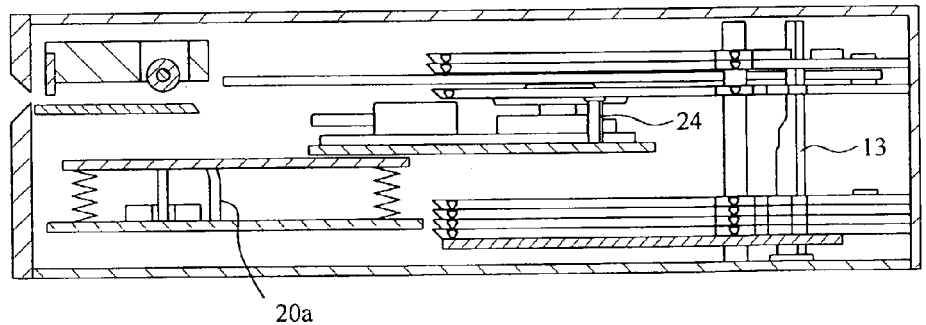
FIG. 14 is a sectional side view showing the operation during disc insertion in the disc player according to the embodiment.

Then, the turntable unit 64 and the fifth stocker 31 are caused to ascend, and an attempt to set the disc 53 on the fifth stocker 31 is made (FIG. 14). However, in this situation, since the center of the disc 53 is off its position, the disc 53 cannot be set in the normal position on the fifth stocker 31. The disc 53 is in a state of being caught between the fifth stocker 31 and the sixth stocker 31 thereabove.

Figure 15:
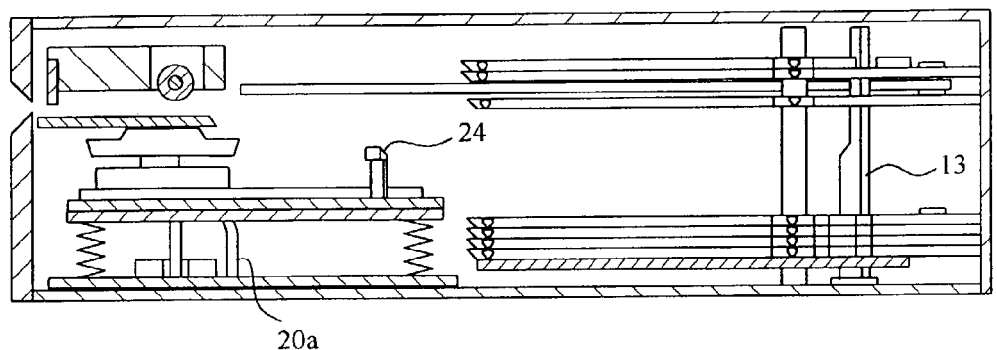
FIG. 15 is a sectional side view showing the operation during disc insertion in the disc player according to the embodiment.

After finishing the removing operation of the disc 53 onto the fifth stocker 31, the turntable unit 64 is moved to under the insert/eject mechanism 73. The slide chassis 23 is also moved back to the position in the insertion standby state (FIG. 15).

Figure 16:
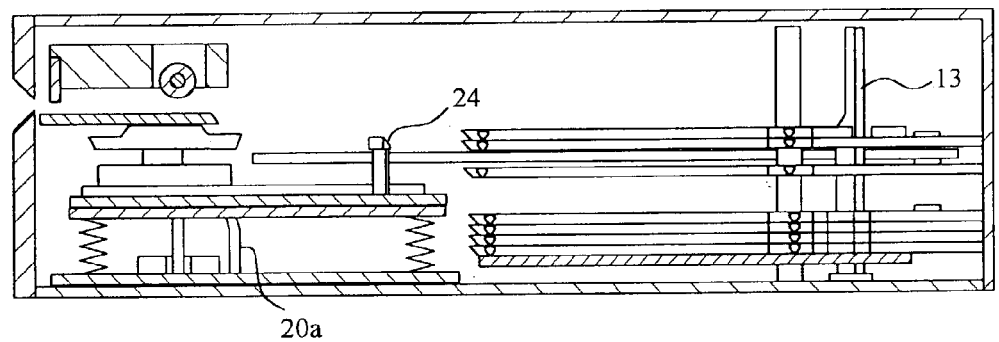
FIG. 16 is a sectional side view showing the operation during disc insertion in the disc player according to the embodiment.

The upper stockers 31 and the stocker top board 32 are caused to descend (FIG. 16). At this time, the front portion of the disc 53 off the fifth stocker 31 descends along the disc guide 24, so that the movement thereof outward from the disc guide 24 is controlled. And when the disc 53 is lowered below the slide chassis 23, the forward movement thereof is controlled with the disc guide 20a, instead of the disc guide 24.

As a result, the movement of the disc 53 is controlled with the disc guides 13, 20a and 24 so that the outer regions of the disc 53 off the fifth stocker 31 is located on the tapered plane 31c of the antifloating claw 31d formed on the stocker 31.

Figure 17:
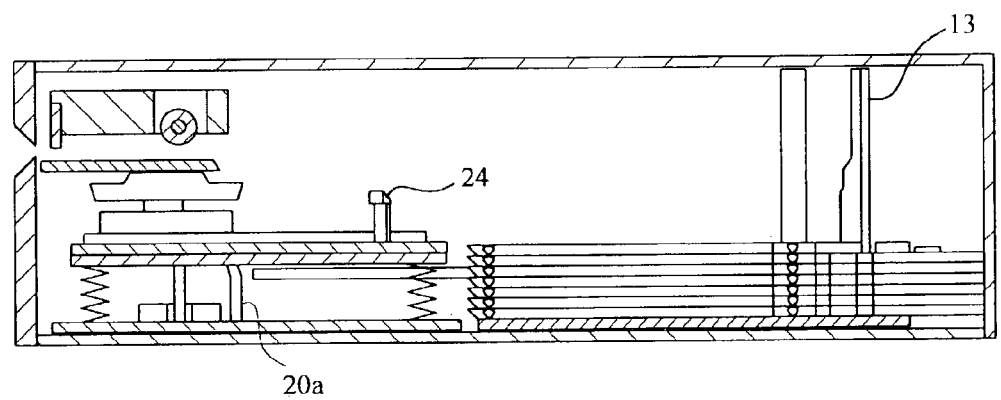
FIG. 17 is a sectional side view showing the operation during disc insertion in the disc player according to the embodiment.

When the stockers 31 are piled up, the disc 53 dislocated on the fifth stocker 31 is pushed onto the disc receiver 31b thereof along the tapered plane 31c so as to be set in the normal position thereon (FIG. 17). After that, the operation can proceed to its normal one.

The operation of the disc player 10 in cases where a disc 53 is dislocated from a stocker 31 during disc reproduction is described below by reference to sectional side views shown in FIGS. 18–22.

Figure 18:
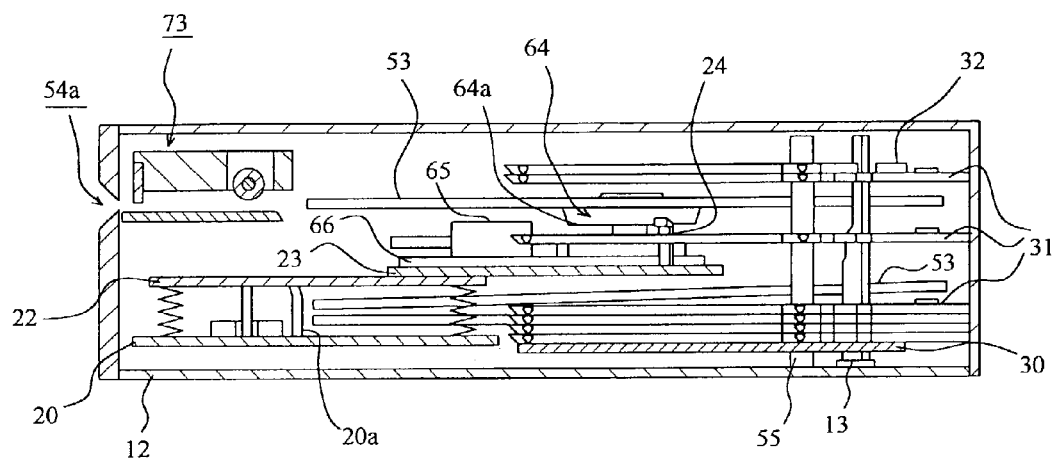
FIG. 18 is a sectional side view showing the operation during disc reproduction in the disc player according to the embodiment.

In the disc player 10, a disc 53 set on the top stocker 31 of the divided lower part (the fourth from the bottom in FIG. 18) is held with a pressing piece (not shown) arranged near the center of the disc and the antifloating claw 31d so as not to be off the stocker 31. However, when vibration or shock stronger than the allowable values is applied thereto, the disc 53 sometimes gets off the stocker 31. FIG. 18 shows the situation.

In the situation of FIG. 18, the position of the fourth dislocated disc 53 is controlled with the disc guide 13 so that it cannot move outward from the periphery 31a of the stocker 31. Moreover, the movement thereof is controlled with the disc guide 20a so that the dislocated disc 53 cannot enter between the mount chassis 20 and the floating chassis 22.

Figure 19:
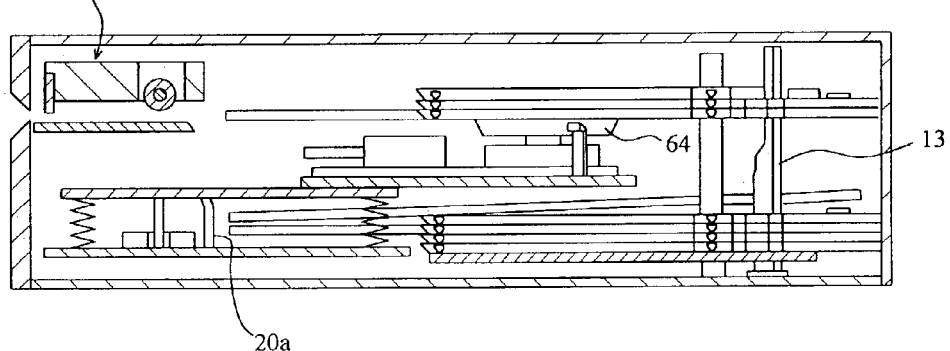
FIG. 19 is a sectional side view showing the operation during disc reproduction in the disc player according to the embodiment.

When a command to change the reproduced disc is given by the user in this situation, in order to set the now-reproducing disc 53 onto the fifth stocker 31, the turntable unit 64 and the fifth stocker 31 are caused to ascend so as to be piled with the upper stocker 31. The catching mechanism of the turntable unit 64 is released and the disc 53 is set on the disc receiver 31b of the fifth stocker 31 (FIG. 19).

Figure 20:
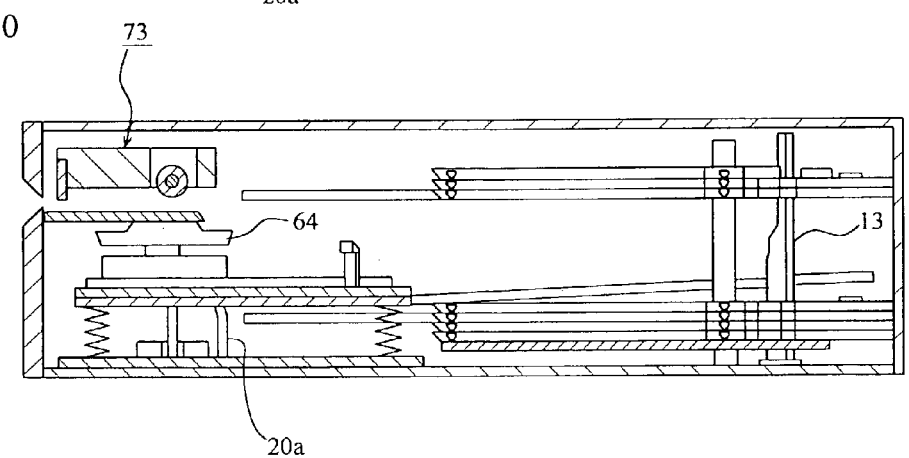
FIG. 20 is a sectional side view showing the operation during disc reproduction in the disc player according to the embodiment.

After finishing the removing operation of the disc 53 onto the fifth stocker 31, the turntable unit 64 is moved to under the insert/eject mechanism 73. The slide chassis 23 is also moved back to the position in the insertion standby state (FIG. 20).

Figure 21:
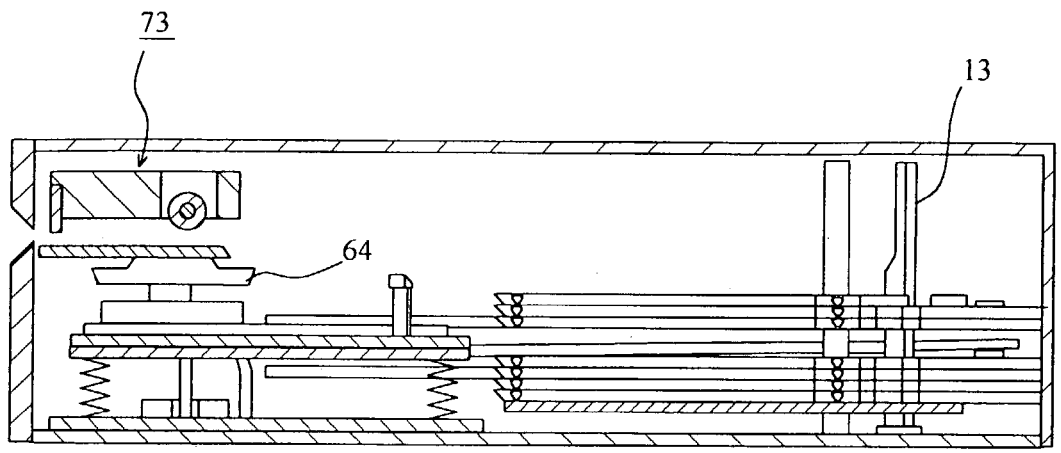
FIG. 21 is a sectional side view showing the operation during disc reproduction in the disc player according to the embodiment.

After that, the stockers 31 piled up in the upper part are lowered so as to be overlaid on the stockers 31 in the lower part (FIG. 21). In this piling, the movement of the disc 53 is controlled with the disc guides 13 and 24 so that the outer regions of the disc 53 on the fourth stocker 31 is located on the tapered plane 31c of the antifloating claw 31d of the stocker 31.

Figure 22:
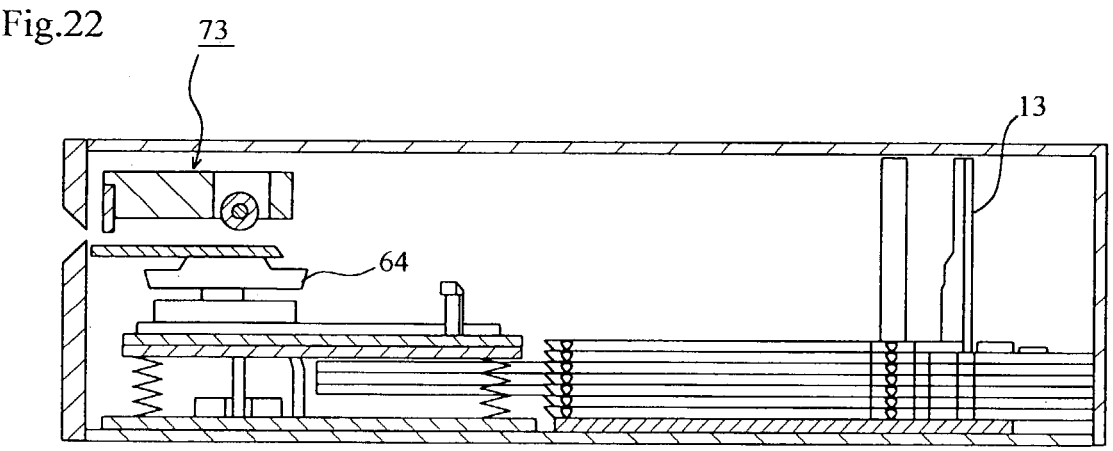
FIG. 22 is a sectional side view showing the operation during disc reproduction in the disc player according to the embodiment.

By lowering all the stockers 31 and piling up them, the disc 53 dislocated on the fourth stocker 31 is pushed onto the disc receiver 31b thereof along the tapered plane 31c so as to be set in the normal position thereon (FIG. 22).

And then, the operation can normally proceed to the division/lifting operation of the stockers 31 for reproducing the selected disc 53.

The operation of the disc player 10 in cases where a disc 53 is dislocated from a stocker 31 because the division operation of the stockers 31 is not normally conducted during the division/lifting operation of the stockers 31 is described below by reference to FIGS. 23–25.

In the disc player 10, when strong vibration or shock is applied thereto during the division/lifting of the stockers 31 in ejecting or changing a disc 53, the engagement states of the division projections 31e of the stocker 31 with the division slide plates 32 on the left and right sides sometimes become different from each other, so that the stocker 31 gets inclined and the disc 53 gets off the stocker 31. FIG. 23 shows the situation.

Figure 23:
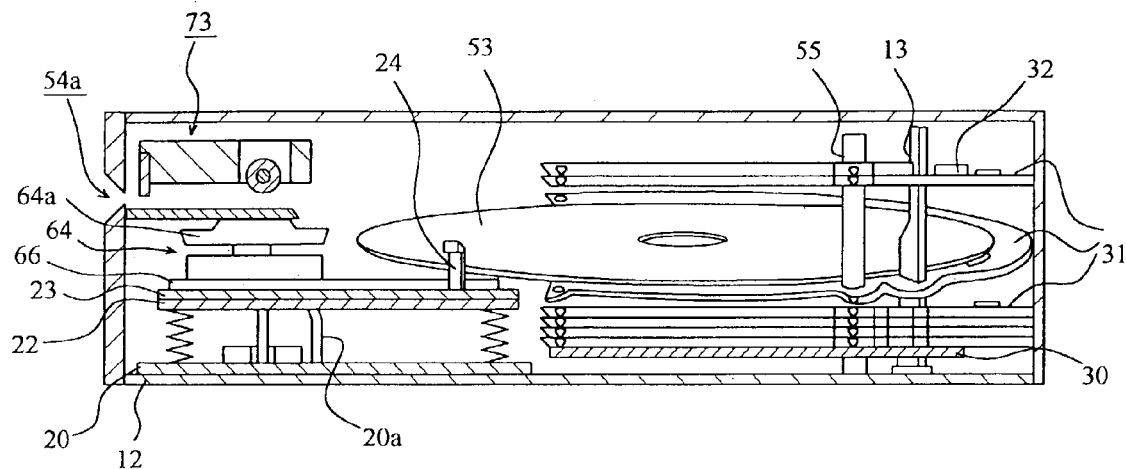
FIG. 23 is a sectional side view showing the operation during stocker lifting/division in the disc player according to the embodiment.

FIG. 23 shows the situation wherein a disc 53 of the fifth stocker 31 from the bottom is selected for reproduction, and in the middle of lifting/division of the fifth stocker 31, strong vibration is applied, resulting in abnormal division.

In this situation, the disc 53 on the inclined fifth stocker 31 cannot be held in a horizontal position, so that it gets off the stocker 31 and moves within the system. However, the position of the dislocated disc 53 is controlled with the disc guide 13 so that the disc 53 cannot move outward from the periphery 31*a* of the stocker 31, and is controlled with the disc guide 24 so that it cannot move outward from the slide chassis 23.

Figure 24:
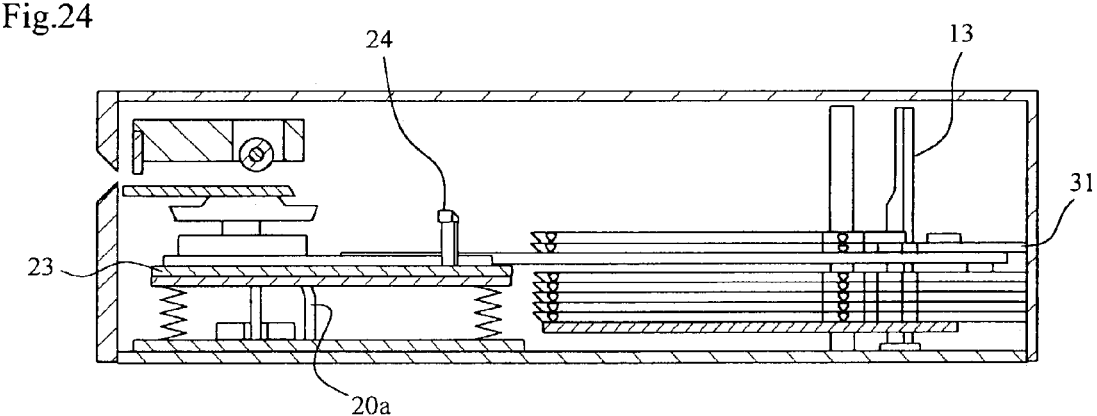
FIG. 24 is a sectional side view showing the operation during stocker lifting/division in the disc player according to the embodiment.

Since it is possible neither to move the turntable unit 64 nor to continue the division of the stockers 31 in this situation, the division slide plates 57 are moved so as to clear the division state, and the stockers 31 in the upper part (the fifth and sixth from the bottom) are caused to descend to be overlaid on the stockers 31 in the lower part (FIG. 24).

In this piling, with the disc guides 13 and 24, the movement of the disc 53 is controlled so that the outer regions of the disc 53 on the fifth stocker 31 is located on the tapered plane 31*c* of the antiflaoting claw 31*d* of the stocker 31.

Figure 25:
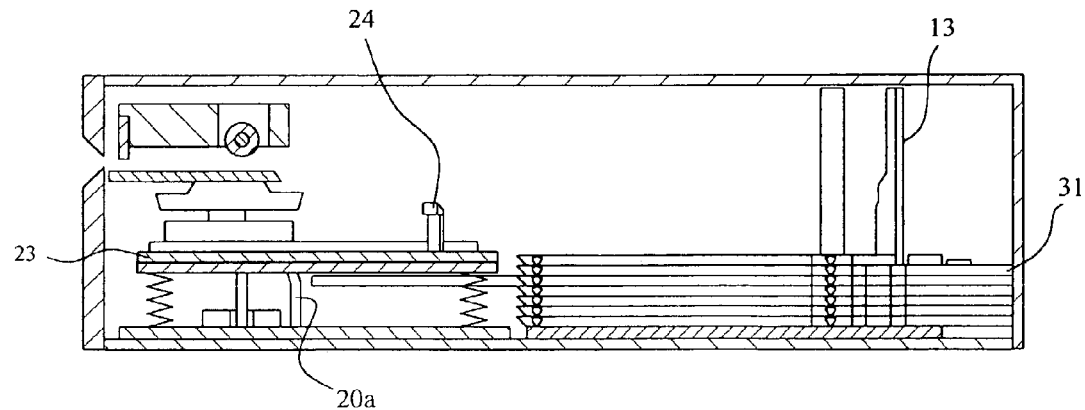
FIG. 25 is a sectional side view showing the operation during stocker lifting/division in the disc player according to the embodiment.

Then, by descending and piling up all the stockers 31, the disc 53 dislocated on the fifth stocker 31 is pushed onto the disc receiver 31*b* thereof along the tapered plane 31*c* to be set in the normal position thereon (FIG. 25).

And then, the division/lifting operation of the stockers 31 can be normally conducted.

Using the above disc player 10 according to the embodiment, even in cases where an inserted disc 53 is not normally set on a stocker 31, in cases where a normally set disc 53 is dislocated from a stocker 31, or the like, the disc guide 13 enables the position control in a manner whereby the disc 53 cannot move outward from the periphery 31*a* of the stocker 31.

The disc guide 24 arranged at a prescribed place on the stocker 31 side of the slide chassis 23 enables the control of the movement of the disc 53 toward the slide chassis 23 side above the slide chassis 23.

And the disc guide 20*a* arranged at a prescribed place on the stocker 31 side of the mount chassis 20 enables the control of the movement of the disc 53 toward the mount chassis 20 side below the slide chassis 23.

Therefore, the movement of the disc 53 outward from the circumference surrounded by the disc guides 13, 24 and 20*a* can be reliably inhibited. By conducting the lifting/division operation with narrowing the movement range of the disc 53 unexpectedly dislocated from the stocker 31 because of vibration or the like, it becomes possible to set the dislocated disc 53 in the normal position on the stocker 31. The occurrence of a problem that the disc 53 cannot be ejected or that the system becomes inoperable can be prevented, so that it is possible to quickly recover the normal operating state.

Since the step portion 13*e* is formed in the disc guide 13, it is possible to prevent the disc 53 in reproduction and the disc guide 13 from coming into contact with each other when the disc 53 is reproduced above the stockers 31.

Since the stocker 31 has the disc receiver 31*b* formed by extending in the direction of the center of the disc 53 set on the stocker 31, which also functions as an antifalling device, the falling of the disc 53 from the stocker 31 can be inhibited, so that it is possible to prevent the disc 53 from being caught in a state of being laid across multiple stockers 31. For example, even in cases where a disc 53 is inserted in a state of inclined relative to the stocker 31, or in cases where a disc 53 is dislocated from the stocker 31 because of vibration or the like so as to get inclined, the falling of the disc 53 from the stocker 31 can be reliably prevented. As a result, the lifting/division operation for setting the disc 53 in the normal position on the stocker 31 can be normally conducted.

Since the tapered plane 31*c* is formed in the periphery 31*a* of the stocker 31, the disc 53 in a dislocated state from the normal position on the stocker 31 can be pushed in along the tapered plane 31*c* in piling the stockers 31 during the lifting/division operation, so that the disc 53 can be surely guided to the normal position.

Since the tapered plane 31*c* also serves as the antifloating claw 31*d*, the antifloating claw 31*c* can be allowed to have the two functions simply by changing the processing shape thereof.

Here, in the above embodiment, the disc guide 13 is mounted on the main chassis 12. However, in another embodiment, the disc guide 13 can be mounted on the stocker bottom board 30.

Moreover, in the above embodiment, four disc guides, comprising the disc guides 13 and 24, are mounted, but the mounting of at least three disc guides in the vicinity of the outer regions of the set disc may be sufficient to obtain almost the same effects, if it is possible to arrange guides in such a manner that every central angle between adjacent guides is more than 90 degrees. Thus, the mounting number or positions of disc guides may be selected as necessary in consideration of operation spacing between the disc guides and other component parts inside the system, or the like.

What is claimed is:

1. A disc player comprising multiple disc setting devices for stocking discs and a lifting division device to lift up and down and divide said disc setting devices, and further comprising a movement control device structured and arranged to control movement of a dislocated disc unexpectedly dislocated from a normal position on one of said setting devices and to guide the dislocated disc to the normal position on the one of said disc setting devices when said multiple disc setting devices are moved in a direction in which said multiple disc setting devices close with each other by said lifting division device.

2. The disc player of claim 1, wherein said movement control device comprises a first disc guide inserted through an insertion hole formed in the periphery of the one of said setting devices and arranged in a direction substantially orthogonal to a disc plane.

3. The disc player of claim 2, wherein said first disc guide has a step portion formed such that an upper portion above a prescribed position is further away from a central axis of a disc when set on the one of said disc setting devices than a lower portion below the prescribed position.

4. The disc player of claim 1, wherein the one of said disc setting devices comprises an antifalling device to prevent the falling of a disc from the disc setting device.

5. The disc player of claim 4, wherein said antifalling device is formed by extending a disc receiver on the one of said disc setting devices in a direction toward the center of a disc to be set on the one of said disc setting devices.

6. The disc player of claim 1, and further comprising a slide chassis operable to horizontally move a disc carrying device on which a turntable and a pickup are mounted to a prescribed position, wherein said movement control device has a disc guide arranged at a prescribed place on a disc setting device side of said slide chassis.

7. The disc player of claim 6, and further comprising a mount chassis arranged below said slide chassis for lifting and lowering said slide chassis, wherein said movement control device has another disc guide arranged at a prescribed place on a disc setting device side of said mount chassis.

8. The disc player of claim 7, wherein said another disc guide is formed by upwardly bending part of said mount chassis.

9. The disc player of claim 1, wherein each said disc setting device comprises a tapered portion thereon for guiding a disc that has become dislocated from the normal position on the disc setting device back to the normal position when said disc setting devices are stacked.

10. The disc player of claim 9, wherein said tapered portion is formed by an anti-floating device operable to prevent a disc that is set on one of said disc setting devices from floating off of the disc setting device.

11. A disc player comprising:
a plurality of disc setting devices for stocking respective discs, said disc setting devices being stackable and usable to stock a corresponding number of discs;
a lifting division device operable to lift and lower said disc setting devices and vertically separate said disc setting devices from each other; and
a plurality of disc guides positioned to control movement of a disc unexpectedly dislocated from one of said disc setting devices so that, upon vertical movement of one or more of said plurality of disc setting devices, the disc is relocated on the one of said disc setting devices.

12. The disc player of claim 11, wherein said plurality of disc guides comprises first disc guides extending vertically through insertion holes in a peripheral portion of said plurality of disc setting devices.

13. The disc player of claim 12, wherein each said first disc guide comprises a step portion separating an upper portion that is spaced further away from a center of said disc setting devices than a lower portion.

14. The disc player of claim 11, further comprising a slide chassis having a disc carrying device thereon on which a turntable and a pickup are mounted, said slide chassis being horizontally movable, wherein said disc guides include a disc guide positioned on a disc setting device side of said slide chassis.

15. The disc player of claim 14, further comprising a mount chassis arranged below said slide chassis for lifting and lowering said slide chassis, said disc guides including a disc guide positioned on a disc setting device side of said mount chassis.

16. The disc player of claim 15, wherein said disc guide positioned on said mount chassis is formed by upwardly bending part of said mount chassis.

17. The disc player of claim 11, wherein said disc setting devices each includes a disc receiver for supporting a disc extending along an inner circumference of said disc receiver.

18. The disc player of claim 17, wherein an antifalling device is formed by inwardly extending said disc receiver at opposite positions of each said disc receiver.

19. The disc player of claim 11, wherein each said disc setting device comprises a tapered portion thereon for guiding a disc that has become dislocated from a normal position on the disc setting device back to the normal position when said disc setting devices are stacked.

20. The disc player of claim 19, wherein said tapered portion is formed by an anti-floating device operable to prevent a disc that is set on one of said disc setting devices from floating off of the disc setting device.

* * * * *